A. RAFFA.
PARACHUTE.
APPLICATION FILED AUG. 31, 1915.
1,185,537.
Patented May 30, 1916.
3 SHEETS—SHEET 1.
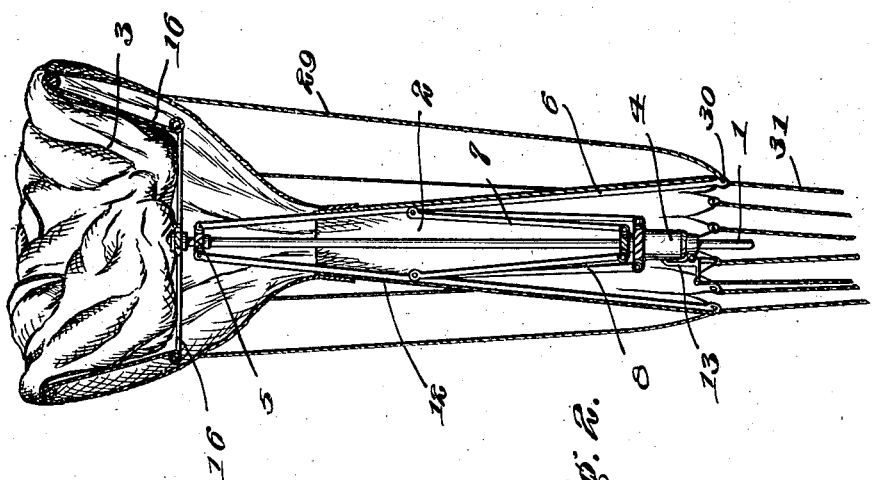
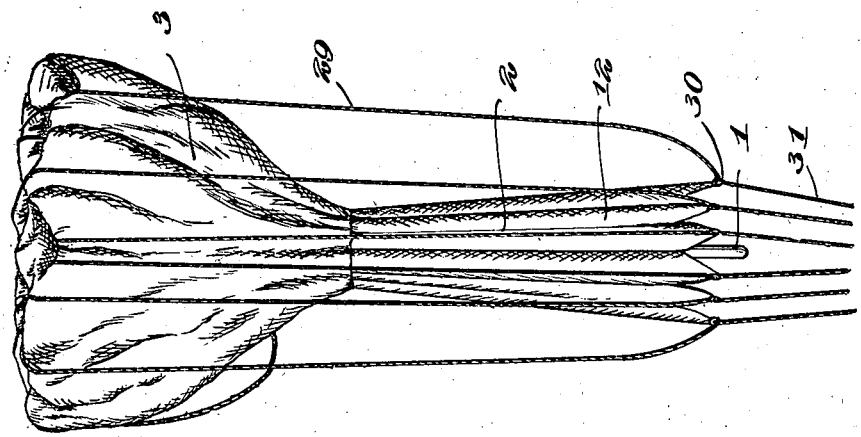
Witness
Frederick L. Fox.
Inventor
Andrew Raffa.
By Victor J. Evans.
Attorney

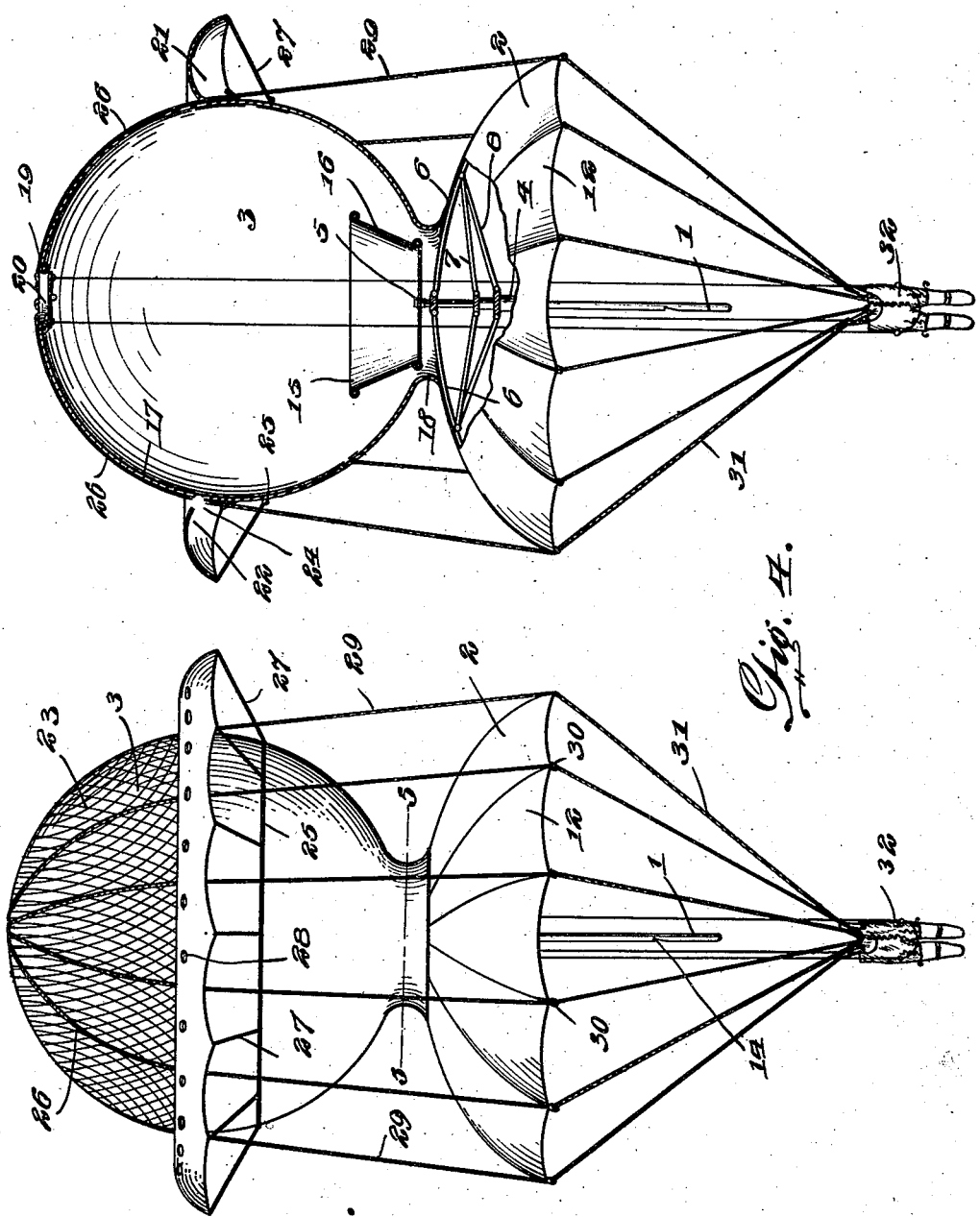

A. RAFFA.
PARACHUTE.
APPLICATION FILED AUG. 31, 1915.

1,185,537.

Patented May 30, 1916.
3 SHEETS—SHEET 3.

Witness
Fredk. L. Fox.

Inventor
Andrew Raffa.
By Victor J. Evans.
Attorney

UNITED STATES PATENT OFFICE.

ANDREW RAFFA, OF BROOKLYN, NEW YORK.

PARACHUTE.

1,185,537.

Specification of Letters Patent.

Patented May 30, 1916.

Application filed August 31, 1915. Serial No. 48,262.

*To all whom it may concern:*

Be it known that I, ANDREW RAFFA, a citizen of the United States, residing at Brooklyn, in the county of Kings and State of New York, have invented new and useful Improvements in Parachutes, of which the following is a specification.

This invention relates to certain new and useful improvements in parachutes, and particularly to a parachute designed for the use of aeronauts and capable of collapsing in compact form for convenient disposal upon an air craft so that the aeronaut, in the event of danger, may employ the parachute to effect his safe descent to the ground.

One object of the invention is to provide a parachute which may be compactly stored for use in an emergency upon a flying machine or airship as stated, and which includes as part thereof a harness or suit to be worn by the aviator, thus insuring the positive support of the aviator during the descent of the parachute and avoiding any liability of the aviator losing his hold or becoming detached from the parachute.

A further object of the invention is to provide a parachute of novel form and construction, comprising a lower or main parachute of the self-opening umbrella type, and an upper or auxiliary parachute comprising a normally flexible or flaccid body adapted to be filled and distended by the air escaping through the vent in the lower parachute and operating as a retarding and sustaining element giving the parachute increased supporting capacity, whereby a parachute of superior efficiency is produced.

A still further object of the invention is to provide a parachute of the described character and construction which embodies novel means for connecting, sustaining and bracing or reinforcing the several parts, suspending the aviator's suit or harness and increasing the sustaining capacity of the parachute as a whole.

The invention consists of the features of construction, combination and arrangement of parts herein fully described and claimed, reference being had to the accompanying drawings in which:—

Figure 6:
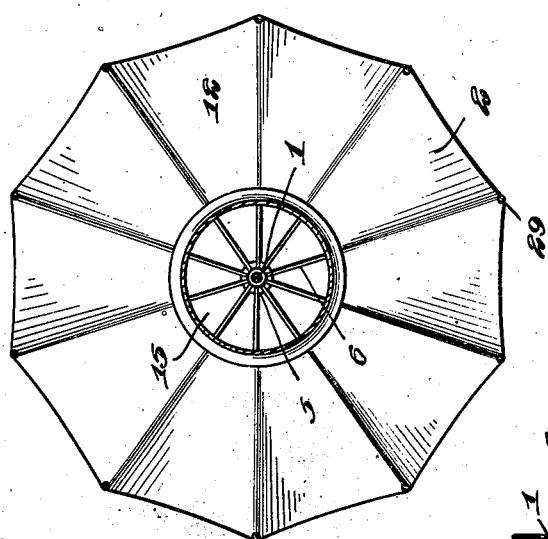
Figure 7:
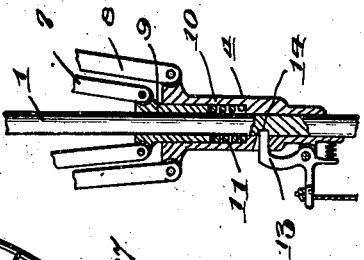
Figure 5:
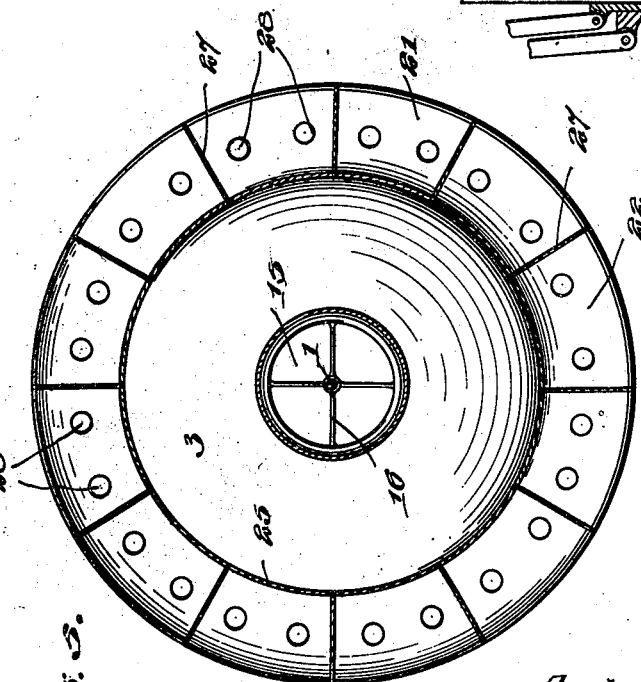

Figure 1 is an elevational view of the parachute as it appears when in folded or collapsed condition. Fig. 2 is a vertical longitudinal section of the same. Fig. 3 is a view in elevation of the parachute as it appears in extended or spread condition. Fig. 4 is a vertical longitudinal section of the same. Fig. 5 is a horizontal transverse section on the line 5—5 of Fig. 3 looking upward. Fig. 6 is a horizontal transverse section taken substantially on the same transverse plane and looking downward. Fig. 7 is a sectional view through the runner of the main parachute on an enlarged scale.

Referring to the drawings 1 designates a rod or staff forming a main carrier or support for a lower main parachute 2 and an auxiliary upper parachute 3. The lower or main parachute 2 is of the umbrella type, consisting of a folding frame made up of a runner 4 in the form of a sleeve slidably engaging the rod or staff 1, a collar 5 fixed to the staff, ribs 6 pivoted at their upper ends to the collar for folding and spreading motions, and sets of stretchers 7 and 8 pivotally connecting the ribs with the runner. The runner shown in the present instance is composed of a pair of relatively movable telescopic sleeves or tubes 9 and 10 inclosing a coiled spring 11. This spring 11 is compressed and tensioned when the runner is drawn downward on the staff for subsequent expansion to automatically spread or open the frame umbrella-fashion, the ribs 6 having attached thereto a covering 12 of silk or other suitable flexible fabric. A catch 13 is provided upon the lower sleeve 10 of the runner to engage and interlock with a kerf or keeper recess 14 in the staff, whereby the main parachute is normally held folded or collapsed. This catch may be released or retracted by the aviator or through the use of any suitable controlling means to open the parachute for a filling action when the occasion for its use arises.

The rod or staff 1 carries a frusto-conical or flaring body 15 arranged to form a primary vent passage between the lower and upper parachute bodies. The upper or auxiliary parachute body 3 is of a flexible or non-rigid type and formed of silk or other fabric, and is preferably of spherical form and composed of a body portion 17 having at its base a neck portion 18 by which it is fastened to the crown of the parachute body 2, and which serves in conjunction with the member 15 as a source of communication between the lower parachute body and the upper parachute body, whereby the latter is adapted to be inflated by the air escaping upwardly from the former. When the parachute bodies are collapsed the member 15 also serves as a form about which the lower portion of the upper parachute body 3 may collapse and by which it will be reinforced to protect the same from injury at and adjacent to the point of junction of the two parachute bodies, when the parachute is in storage or in course of transit. Extending around the parachute body 3, at or about the middle portion thereof, is a flap or apron 21 adapted to be spread outward under pressure into the concavo convex form to form an air confining space or pocket 22, and to act as an auxiliary sustaining element coöperating with the parachute body proper to further increase the sustaining power of the parachute.

Each parachute body may or may not be provided with a reinforcing netting 23, and suitable reinforcing and stay connections are provided between the parts of the parachute as a whole, which connections may or may not be formed in part by the netting cords. As shown in the present instance, reinforcing ropes or strands 24 and 25 encircle the upper portion of the upper parachute, and extending between the upper annular reinforcing element 24 and the reinforcing ring 19 are flexible stays 26, other stays 27 connecting the lower annular reinforcing element 25 with the flap or skirt 21 to stay said flap or skirt when spread and under the pressure of the air within the pocket 22. Small perforations 28 may be provided in said flap for the slow escape of the confined air from the pocket 22 to prevent excess pressure and liability of the breaking of the reinforcing stays 27 or of the flap being forced up to an inoperative position. Stays 29 also extend from the reinforcing element 24 to rings 30 at the ends of the ribs 6 to reinforce the spread lower parachute and mutually sustain the two parachutes. To the rings 30 are also attached suspending cords 31 which fasten t the parachute a garment or harness 3 adapted to be worn by and secured to the person of the aeronaut, so that at all times the aviator may be in readiness to jump from the machine with the parachute and to be fastened to the parachute and supported for a safe descent to the ground.

Normally the parachute in a collapsed or folded condition is suitably disposed upon some part of an aeroplane or airship in position for being instantly cast off or launched by the aviator in the event of danger. When the aviator launches himself with the parachute into free air, he releases the catch 13 or said catch is automatically released so that the main parachute will be instantaneously spread by its opening spring so as to fill with air. As this air is compressed within the main parachute it arrests the speed of descent of the aviator and discharges through the vent opening 15 into the upper or auxiliary parachute 3 and fills and spreads or distends the same. The parachute 3 when distended acts in the nature of a retarder supplementing the resistance of the main parachute to descent, and this action is further augmented or increased by the sustaining action of the flap 21. The compressed air discharging from the main parachute expands through the vent into the auxiliary parachute 3 and accumulates in said auxiliary parachute until the latter is distended to its fullest capacity, whereupon the air will vent slowly through the outlet 20 while other air enters through the vent 15 to take its place.

It will thus be seen that the invention provides an instantaneously opening parachute which is adapted for immediate use to carry the aeronaut to the ground with absolute safety, and that owing to the increased supporting capacity of the parachute its efficiency is greatly increased over parachutes of ordinary construction.

Other advantages will be evident to those skilled in the art from the foregoing description.

I claim:—

1. A parachute comprising a lower or main parachute body of the self-opening umbrella type and having a vent in its crown portion, and an upper or auxiliary parachute body of the flexible balloon type and having an air inlet at its lower end communicating with the vent of the main parachute and a final vent at its upper end, said auxiliary parachute to provide an air containing pocket or space, substantially as described.

2. A parachute comprising a lower main parachute body of the self-opening umbrella type and embodying a staff, a runner, ribs and stretchers and a fabric covering, together with a collar carried by the staff and to which the ribs are pivoted, an upper parachute body of the flexible balloon type comprising a bag or sack having an air inlet at its lower end communicating with said vent opening in the main parachute, and having a vent opening at its top and a depending flap at its middle portion, suitable stays connecting and reinforcing the parts of the parachute, and an aviator's harness secured to the lower or main parachute.

In testimony whereof I affix my signature in presence of two witnesses.

ANDREW RAFFA.

Witnesses:
JOSEPH MARTINIANO,
ANDREW CHIPARI.